United States Patent [19]
Chen et al.

[11] Patent Number: 5,797,016
[45] Date of Patent: Aug. 18, 1998

[54] REGENERATION AGENT FOR BACK-UP SOFTWARE

[75] Inventors: Chia-Hwang Chen, Plainview; Miguel Long, Brooklyn; William Hsieh, Syosset, all of N.Y.

[73] Assignees: Cheyenne Software Inc.; Cheyenne Software International Sales Corp., both of Roslyn Heights, N.Y.

[21] Appl. No.: 743,459

[22] Filed: Oct. 29, 1996

[51] Int. Cl.[6] .............................. G06F 11/14; G06F 13/00
[52] U.S. Cl. .................................... 395/712; 395/653
[58] Field of Search ................................ 395/712, 652

[56] References Cited

U.S. PATENT DOCUMENTS

| | | | |
|---|---|---|---|
| 4,177,510 | 12/1979 | Appel et al. | 711/163 |
| 4,725,977 | 2/1988 | Izumi et al. | 711/115 |
| 4,751,648 | 6/1988 | Sears, III et al. | 707/102 |
| 4,856,787 | 8/1989 | Itkis | 273/237 |
| 5,056,000 | 10/1991 | Chang | 395/800.21 |
| 5,086,502 | 2/1992 | Malcolm | 395/182.06 |
| 5,101,479 | 3/1992 | Baker et al. | 395/285 |
| 5,109,384 | 4/1992 | Tseung | 395/182.02 |
| 5,131,081 | 7/1992 | MacKenna et al. | 395/842 |
| 5,133,065 | 7/1992 | Cheffetz et al. | 395/181 |
| 5,138,712 | 8/1992 | Corbin | 395/186 |
| 5,144,551 | 9/1992 | Cepulis | 711/163 |
| 5,163,131 | 11/1992 | Row et al. | 395/200.32 |
| 5,170,466 | 12/1992 | Rogan et al. | 707/530 |
| 5,185,693 | 2/1993 | Loftis et al. | 395/182.11 |
| 5,187,750 | 2/1993 | Behera | 707/7 |
| 5,204,954 | 4/1993 | Hammer et al. | 395/842 |
| 5,212,772 | 5/1993 | Masters | 395/182.18 |
| 5,218,695 | 6/1993 | Noveck et al. | 707/205 |
| 5,222,122 | 6/1993 | Hamilton et al. | 379/32 |
| 5,226,157 | 7/1993 | Nakano et al. | 711/162 |
| 5,237,661 | 8/1993 | Kawamura et al. | 395/872 |
| 5,247,626 | 9/1993 | Firoozmand | 395/200.42 |
| 5,247,670 | 9/1993 | Matsunaga | 395/200.33 |
| 5,274,815 | 12/1993 | Trissel et al. | 395/567 |
| 5,276,860 | 1/1994 | Fortier et al. | 395/182.04 |
| 5,297,195 | 3/1994 | Thorne et al. | 379/93.23 |
| 5,313,637 | 5/1994 | Rose | 395/186 |
| 5,317,691 | 5/1994 | Traeger | 395/681 |
| 5,321,816 | 6/1994 | Rogan et al. | 711/163 |
| 5,324,035 | 6/1994 | Morris et al. | 463/42 |
| 5,339,430 | 8/1994 | Laundin et al. | 395/685 |
| 5,365,577 | 11/1994 | Davis et al. | 379/93.17 |
| 5,452,433 | 9/1995 | Nihart et al. | 711/162 |
| 5,469,573 | 11/1995 | McGill, III et al. | 395/653 |
| 5,495,610 | 2/1996 | Shing et al. | 395/200.51 |
| 5,544,320 | 8/1996 | Konrad | 395/200.09 |
| 5,634,052 | 5/1997 | Morris | 395/601 |
| 5,664,186 | 9/1997 | Bennett et al. | 711/162 |

*Primary Examiner*—Emanuel Todd Voeltz
*Assistant Examiner*—John Q. Chavis
*Attorney, Agent, or Firm*—Kenyon & Kenyon

[57] ABSTRACT

A system for updating an agent used in a backup software program. The backup software program operates on a network having, for example, a server and a number of workstations. A backup engine executes on the server. An agent executes on each of the workstations to be backed up. The backup engine transmits an updated agent to each workstation, transmits an executable regeneration module to each workstation and transmits an execute command to the agent at each workstation. The agent at each workstation stores the updated agent and the executable regeneration module and causes the execution of the executable regeneration module. The executable regeration module deletes or renames the agent, and also renames the updated agent to the name of the agent and thereafter enables operation of the updated agent as the agent.

14 Claims, 4 Drawing Sheets

REGENERATION AGENT FOR BACK-UP SOFTWARE

FIELD OF INVENTION

The present invention is directed to agent modules used in back-up software systems, and more particularly, to a system and method for updating agent modules on a remote workstation.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

Modern computer networks are often organized according to a client/server architecture. A client/server architecture is an arrangement used on local area networks ("LANs") that treats both the server and the individual workstations as intelligent, programmable devices. Typically, a LAN comprises a number of "front-end" client computers and a "back-end" server. The client component, typically a personal computer, offers the user its full range of power and features for running programs. Usually, the client computer (called herein a workstation) has its own processing capability and a hard disk drive or other local storage device. The server, which can be a personal computer, a minicomputer or a mainframe, enhances the client component by providing services such as data management, information sharing and security. Servers provide services to workstations including, for example, back-up services.

Often, a user of the LAN (typically a network manager) wishes to back-up data stored on the hard drive(s) of some or all of the computers on the LAN, including the workstations. In the back-up process, the files stored on workstations and servers of the LAN are down-loaded onto a central storage device, such as a tape on a tape drive. Thus, for example, if a file is damaged on a workstation, the network manager can retrieve the back-up copy of the lost data from the central back-up storage device.

A typical back-up program has a number of components. A backup engine, running centrally on the server, can control the writing of data to the backup storage device (for a backup job), control the reading of data from the backup storage device (for a restore job), manage a task queue of jobs, and control communications with the client computers. An administrator console, which typically runs on a client computer, assists the network manager manage the backup of workstations. For example, the administrator console will perform tasks such as job submission, viewing log files, database management, scheduling and the like.

Back-up programs often include agents. An agent is a small piece of software that is stored on and processed by each workstation to perform slave tasks for the server. Thus, the agent runs on each computer to be backed up. The agent is not a complete computer program, but rather, a piece of software to support the server in completing a task defined for the workstation on which the agent is running. In backup programs, one job of the agent is to move data from the workstation to the server and receive data from the server and store it at the workstation.

Using agents to assist in the backup and restore process has a number of advantages. Because there is an agent running on each workstation (and each workstation, of course, has its own processor), processing can take place concurrently on each workstation. Communication overhead is reduced and network security is enhanced, as the agent can, for example, determine the content of a workstation's storage device and make decisions as to files to be backed up, without the need to provide the server with a list of files stored on the workstation.

A disadvantage of current agent technology in backup programs results from the fact that agents are located at each workstation. Thus, if the network administrator wishes to update the backup program to a newer release of the program, the network administrator will often need to locate and update each agent on each workstation. Since there may be many workstations located in many physical locations, this could be a difficult and time consuming task.

In particular, in a distributed application, it is difficult to synchronize the updating of agents on the plurality of workstations.

The need to update agents is likely to become more common. For example, agents for various backup programs are often bundled with operating system programs for workstations. A user will then purchase the backup program, comprising the backup engine and administrator console. The backup engine will communicate with each workstation, as each workstation has an agent preinstalled with the operating system. However, when the backup program is updated to a new release, the backup engine and administrator console can easily be replaced/updated, but it is difficult and time consuming to replace/update each agent.

There is also a need to apply updates and cause the updated agents to be available for use by the backup engine at the same time.

SUMMARY OF THE INVENTION

The present invention is directed to a method and system for updating or replacing agents stored and executing on a remote computer, in particular, a workstation in a client/server network. In the representative embodiment, the agents are utilized in a backup software program and perform slave tasks for a backup engine running on a central server.

Each agent is a small piece of software that is stored and executes on each workstation to support the backup engine in completing a task defined for that workstation. Thus, in summary, each agent is a module that resides on a workstation that is being backed up or restored and performs, e.g., file processing on that workstation.

In the representative embodiment, the backup program that utilizes the present invention has three major components. The backup engine, located on the server, controls the writing of data to the backup storage device (for a backup job), controls the reading of data from the backup storage device (for a restore job), manages a task queue of jobs, and controls communications with the client computers. An administrator console, which runs on a client computer, enables management of the backup and restore operations. As stated above, an agent runs on each workstation to be backed up.

For ease of explanation, when used herein, the term "backup" includes "restore", the term "update" includes "replace" and "modify", and the term "LAN" includes a wide area network ("WAN") and an enterprise wide network.

The updating of an agent occurs according to the representative embodiment of the present invention as follows. Assume that each agent is named A1. The backup engine electronically transmits, across the network to each workstation, a replacement agent file (A2) that comprises the executable code for the agent to replace A1. The backup engine also electronically transmits to each workstation an executable regeneration module, for example, named "Swapit". A1 and Swapit are stored by A1 at the workstation.

Optionally, each agent A1 transmits a message to the backup engine verifying successful receipt of A2 and Swapit.

Thereafter, the backup engine transmits to each workstation (i.e., to A1 on each workstation) an "execute/terminate" command. Each agent A1 then loads and causes to be executed by its workstation the Swapit module, and then each agent A1 terminates its own operation.

The Swapit module, executing on each workstation, renames A1 to preserve a copy of A1. The Swapit module then renames A2 to a new name appropriate for execution, for example, to A1. The Swapit module causes A1 to execute or to be available for execution, for example, upon receipt of a command from the backup engine.

If desirable, the present invention can be used to update a subset of the agents on a LAN.

Each workstation may have more than one backup agent. The present invention is scalable and can easily accommodate updating of more than one agent stored on a workstation.

If the update operation is not successful, the present invention has the capability to allow a graceful backing out of the process and restoration of the old agent (e.g., A1 in the example above).

The present invention can coordinate the timing of the update. For example, for a large LAN, the transmission of the new agent (e.g. A2) can occur over a number of evenings, and execution of the Swapit module can take place on all workstations simultaneously.

The backup agent of the present invention has capabilities to enable the efficient backup of the storage devices on all workstations on the network. When used in conjunction with the update process, network communication overheads are reduced.

It will be noted, for example, that the backup engine need only communicate with the workstations on two occasions (when transferring the new agent and the Swapit module and when issuing the "execute/terminate" instruction). All processing is performed "automatically" either by the "old" agent or the Swapit module, both executing on the workstation, rather than in response to a series of commands from the server.

Compression and decompression techniques also can be used to reduce transmission times and intermediate storage costs.

BRIEF DESCRIPTION OF THE DRAWINGS

The foregoing and other features of the present invention will be more readily apparent from the following detailed description of exemplary embodiments taken in conjunction with the attached drawings wherein.

DETAILED DESCRIPTION

Figure 1:
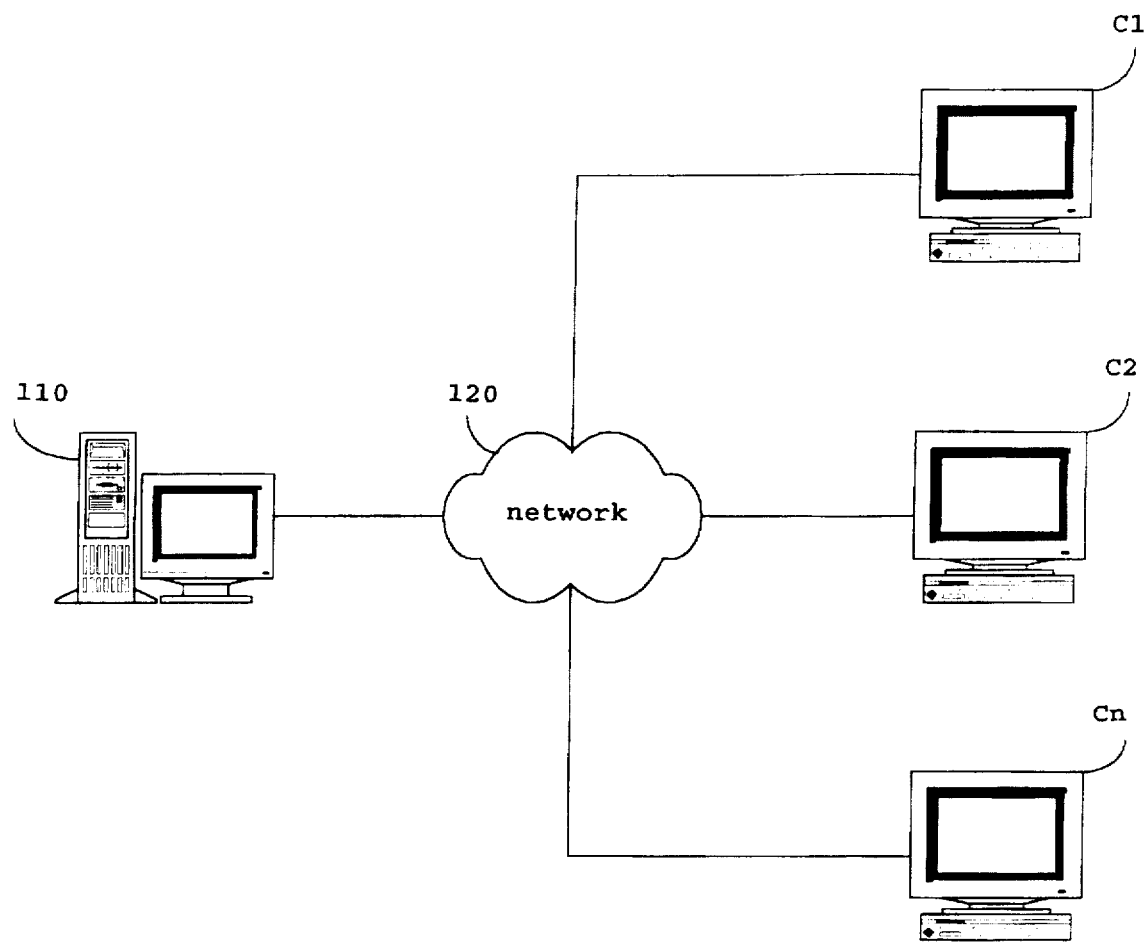
FIG. 1 is a system diagram of a network architecture utilized by the invention.

Referring now to the drawings and initially FIG. 1, there is illustrated a diagram of a representative network used in conjunction with the present invention. A server 110 is coupled to client computers C1–Cn through a network 120. The network 120 may be any type of network that supports computer-to-computer communication such as a local area network (LAN), a wide area network (WAN), or a public switched network (PSN) supporting any range of protocols such as TCP/IP, Ethernet, X.25, etc. The server 110 executes a backup engine program. The server 110 is coupled to a backup storage device (not shown).

Each of the client computers C1–Cn is a workstation having an operating system program, such as, for example, the Windows 95 or Windows NT operating system. Each client computer C1–Cn stores and can execute (when instructed to do so by the backup engine) an agent. Each agent performs certain tasks for the backup engine at each of the client computers C1–Cn. The agent is configured, for example, to open and/or connect to a socket and "listen" for commands directed to it from the backup engine on the server 110. For example, the backup engine may request that each agent "push" selected files to the server 110 so that the server 110 (under control of the backup engine) can copy the files to the backup storage device.

The following is a more detailed illustrative description of some of the functions that can be performed by the agent of the present invention. A backup job may specify particular files that are to be backed up or criteria for files to be backed up (e.g., all files created by Bob, all WordPerfect files, etc.). The backup job is created at the administrator console, which runs on a client computer (e.g. C2), and is executed by the backup engine on the server 110. If a specified file is to be backed up, the backup engine sends a request to the agent running on the client computer where the file is located, and the agent checks to see if the file is available for backup, and sends a copy of the file to the backup engine. If criteria is used to identify the files to be backed up, the backup engine provides the criteria to the agents on the appropriate client computers. Each agent will then traverse the directory structure of the storage devices. If a file is located by the agent that matches the criteria, a copy of the file is sent by the agent to the backup engine. Alternatively, a circular buffer can be used—the agentA adds file names that match the criteria to the buffer and agentB performs the read/write operation to send that file to the backup engine. Thus, it will be seen that the agent supports, as a slave, the server in completing a task defined for that client computer.

Figure 2:
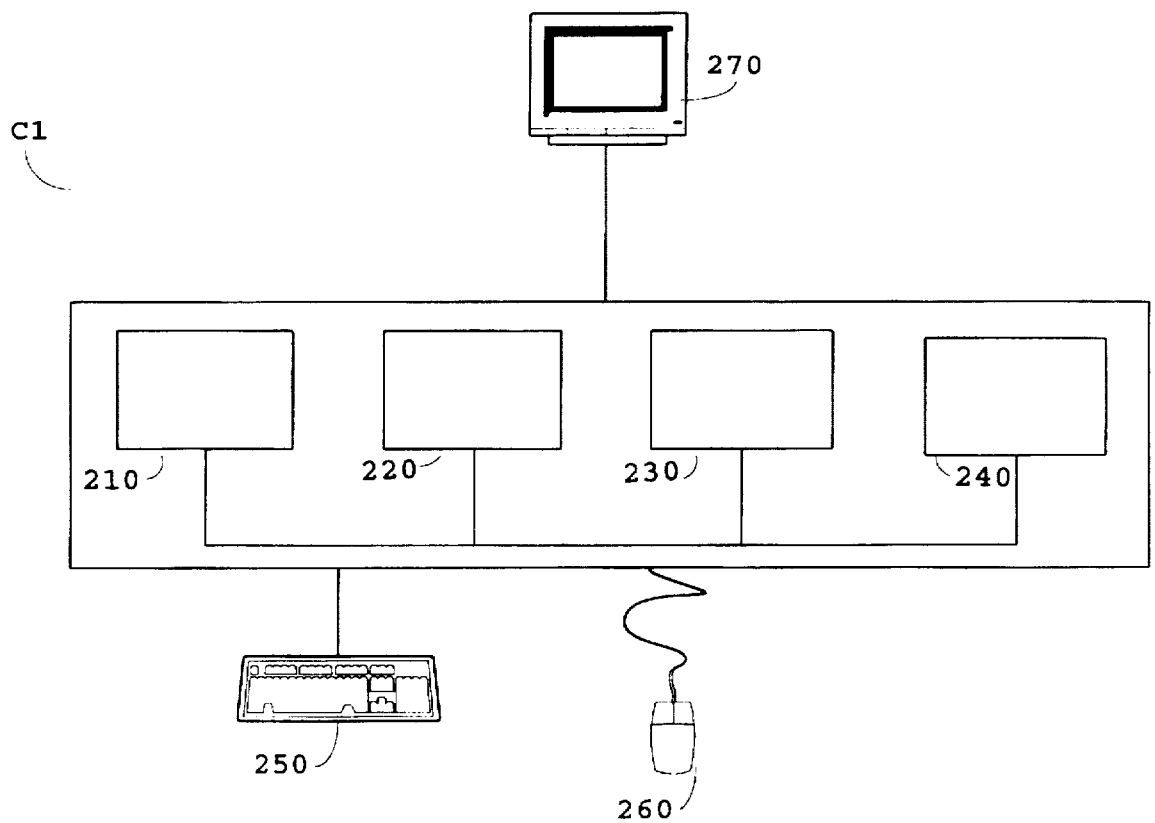
FIG. 2 is a block diagram of an illustrative hardware configuration of a client system.

FIG. 2 illustrates in further detail the hardware configuration of the client computer (e.g., C1) of FIG. 1. In the representative embodiment, the client computer C1 comprises a central processing unit 210 for executing computer programs (including the agent according to the present invention) and managing and controlling the operation of the client computer C1. Storage device 220, such as a floppy disk drive, is coupled to the central processing unit 210. Storage device 230, coupled to the central processing unit 210, also provides a means for storing computer programs and data. Storage device 230 is preferably a hard disk having a high storage capacity. A dynamic memory device 240, such as a RAM, is coupled to the central processing unit 210. The client computer C1 includes typical input/output devices, such as, for example, a keyboard 250, a mouse 260 and a monitor 270. Each of the remaining client computers C2–Cn may be similarly configured. The server 110 may also be similarly configured but may further include connections to a plurality of high capacity storage media.

According to the present invention, agent on each client computer C1–Cn is updated from the server 110. Thus, the "new" agent is received from a storage device on the server. Alternatively, the "new" agent may be originally stored on, and therefore received from, any other computer connected to the network 120 and communicating with the client computers C1–Cn.

Figure 3:
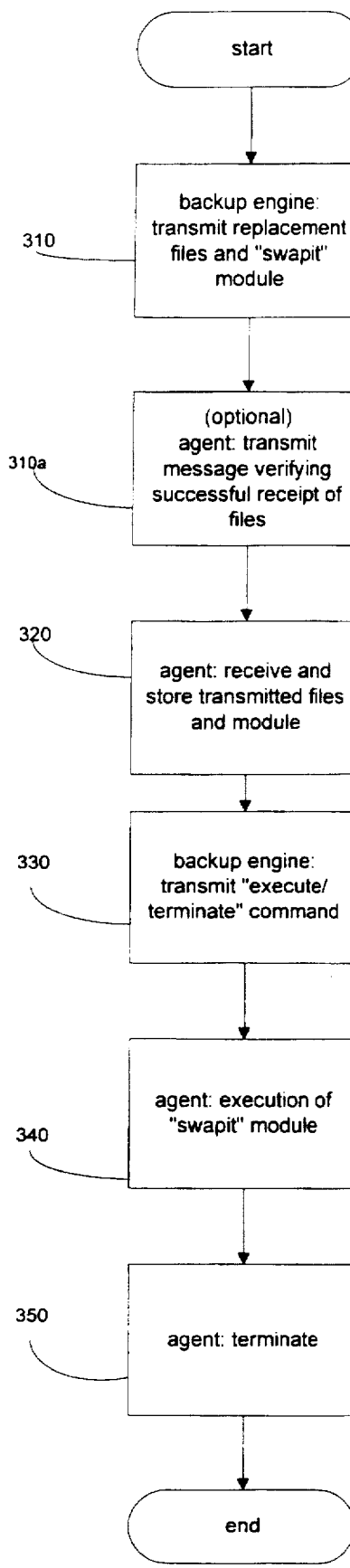
FIG. 3 is a flowchart of an exemplary update process of a representative embodiment of the present invention.

FIG. 3 is a flowchart illustrating a representative update process according to the present invention.

In accordance with an exemplary embodiment of the invention, the backup engine first transmits (or causes to be transmitted) to each client computer C1–Cn (or to a subset thereof) files containing the updated agent (step 310). Also transmitted is a "Swapit" module that is described in detail in connection with the flow chart of FIG. 4 (step 310).

The "old" agent (executing on each client computer C1–Cn) receives and stores the files transmitted by the workstation (step 310). The received files are stored locally at the client computer C1–Cn (e.g., in storage device 230) and may have a file extension of "new" to indicate a new file. Thus, for example, "agent.new" may represent the new executable agent (to be later renamed). The "old" agent may then optionally transmit messages back to the backup engine verifying the files were successfully received and stored (step 310a).

Next, the backup engine transmits an "execute/terminate" command to the appropriate client computers C1–Cn (step 330). The execute/terminate command may include a parameter identifying a procedure for the client computer C1–Cn to execute (e.g., in this case "Swapit.") In response thereto, each agent loads and causes to be executed the program identified in the parameter, e.g., Swapit (step 340) and then shuts itself down (step 350).

Figure 4:
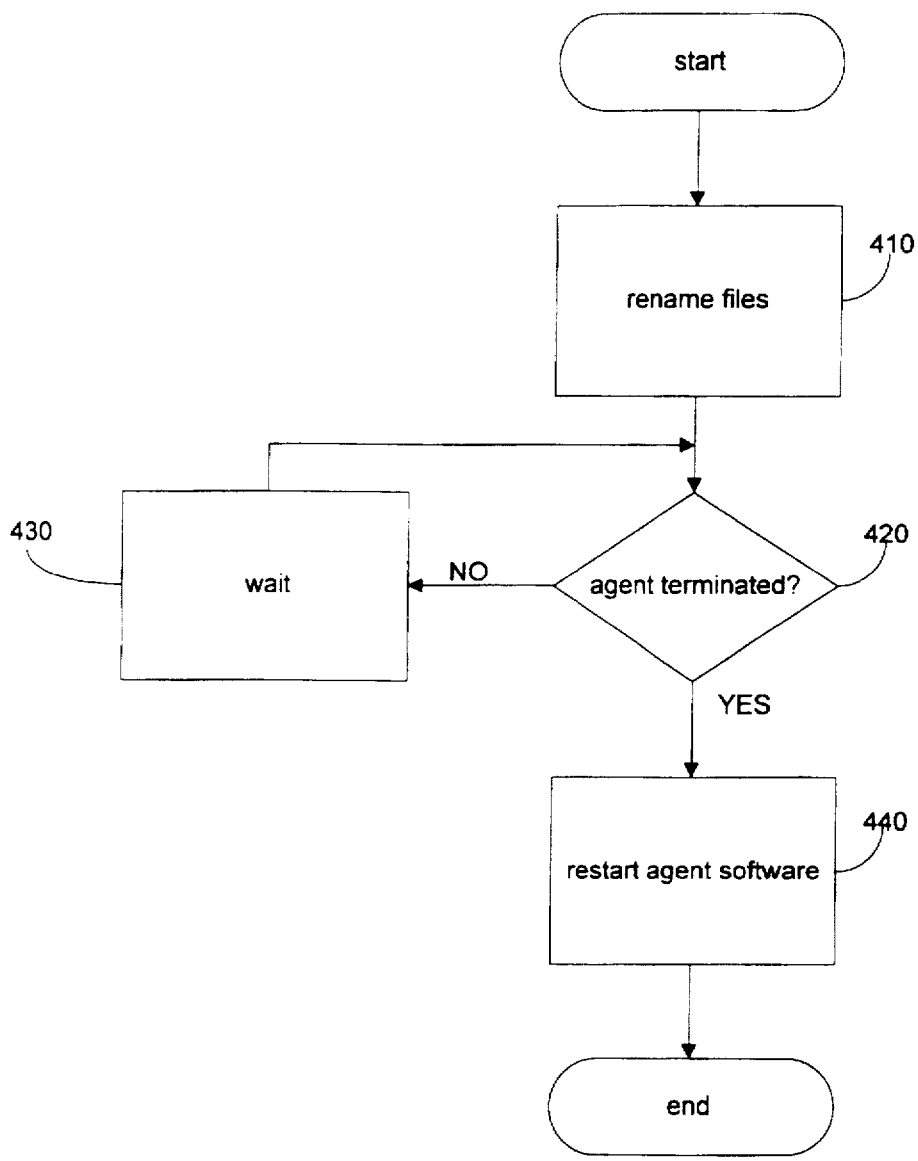
FIG. 4 is a flowchart of the operation of an exemplary update module.

The flowchart of FIG. 4 provides details of an exemplary program flow of the Swapit module of steps 310 and 340 of FIG. 3. The Swapit module executes on each client computer C1–Cn. The Swapit module may execute concurrently on each client computer C1–Cn. Upon commencement of execution, the Swapit module renames the "old" agent to a new name so as to preserve a copy of that version of the agent (step 410). For example, "agent.exe" may be renamed to "agent.old." (Alternatively, the Swapit module may simply delete the old agent.) The Swapit module then renames the files associated with the updated agent to a new name appropriate for execution (step 410). E.g., "agent.new" is renamed to "agent.exe."

Once updated, the new agent can remain ready to act as the slave of the backup engine. Alternatively, it may be desirable to cause the new agent to execute upon the end of the update process. Thus, the following additional steps take place at the client computer. Subsequent to renaming all appropriate files, the Swapit module determines whether the old agent is still executing (step 420). This may be accomplished, for example, by invoking a Windows NT command which returns the "handle" of an executing module. If a handle is returned when the handle for the agent module is requested, the agent is still executing. In that case, the Swapit module waits for a predetermined length of time (step 430) and then checks again for a "handle" (step 420). If a handle is not returned, the old agent has terminated. The Swapit module then starts the agent software, i.e., the updated agent (step 440).

It will be appreciate that steps 310 to 320 can be performed over a period of time, for example, when network use is low. Once all client computers C1–Cn have received the updated agent and the Swapit module, then the "execute/terminate" command can be sent substantially simultaneously to all client computers C1–Cn where updating is to take place.

If desirable, the new agent and the Swapit module can be transmitted to the client computers C1–Cn in one package or, alternatively, in separate files at separate times.

Optionally, the new agent can delete the Swapit module.

An variation to the above may include the transmission of software patch to the agent rather than a replacement agent. In that case, the Swapit module would i) make a backup copy of the old agent, ii) apply the software patches to the old agent, and iii) make the agent available for execution.

In an alternative embodiment, the Swapit module can be configured to be self executing, for example, at a predetermined time. Thus, there would be no need for step 330. The Swapit module would, at step 350, determine if the agent was executing, and pause operation until a time when the agent was not executing.

It will be appreciated that the principles of the present invention can be applied to the updating of any agent executing on a remote system, not merely backup agents.

The agent and Swapit modules of the present invention can be implemented utilizing a logic circuit or a computer memory comprising encoded computer-readable instructions, such as a computer program. The functionality of the logic circuit or computer memory is described in detail above.

While the present invention has been particularly shown and described with reference to exemplary embodiments thereof, it will be understood by those skilled in the art that various changes in form and details may be made therein without departing from the spirit and scope of the invention.

What is claimed is:

1. A method for updating an agent used in a backup software program, the backup software program operating on a network having a server and a plurality of workstations, the backup software program including a backup engine executing on the server and an agent executing on each workstation to be backed up, the method comprising the steps of:

under the control of the backup engine, transmitting an updated agent to the agent at each workstation;

under the control of the backup engine, transmitting an executable regeneration module to the agent at each workstation;

under the control of the agent at each workstation, storing the updated agent and the executable regeneration module at each workstation;

under the control of the backup engine, transmitting an execute command to the agent at each workstation;

under the control of the agent at each workstation, causing the execution of the executable regeneration module;

terminating the operation of the agent;

under the control of the executable regeneration module at each workstation, deleting the agent;

under the control of the executable regeneration module at each workstation, renaming the updated agent to the name of the agent; and under the control of the executable regeneration module at each workstation, enabling operation of the updated agent as the agent.

2. The method of claim 1 further comprising the step of, under the control of the agent at each workstation, notifying the backup engine of successful receipt of the updated agent and the executable regeneration module.

3. The method of claim 1 further comprising the step of deleting the executable regeneration module.

4. The method of claim 1 wherein the step of transmitting an execute command to the agent at each workstation occurs so as to enable simultaneous updating of each agent.

5. A method for updating an agent used in a backup software program, the backup software program operating on a network having a server and a plurality of workstations, the server coupled to a backup storage device, the method comprising the steps of:

providing a backup engine for execution on the server;

providing an agent for execution on each of the plurality of workstations as a slave of the backup engine;

under the control of the backup engine, transmitting an updated agent to each workstation;

under the control of the backup engine, transmitting an executable regeneration module to each workstation;

under the control of the agent at each workstation, storing the updated agent and the executable regeneration module at each workstation;

under the control of the backup engine, transmitting an execute command to the agent at each workstation;

under the control of the agent at each workstation, causing the execution of the executable regeneration module;

terminating the operation of the agent;

under the control of the executable regeration module at each workstation, renaming the agent to a recovery name;

under the control of the executable regeneration module at each workstation, renaming the updated agent to the name of the agent; and under the control of the executable regeneration module at each workstation, enabling operation of the updated agent as the agent.

6. The method of claim 5 further comprising to step of executing the agent at a workstation to assist the backup engine in a backup operation where files stored on the workstation are backed up across the network to the backup storage device.

7. The method of claim 6 further comprising the step of, under the control of the agent at each workstation, notifying the backup engine of successful receipt of the updated agent and the executable regeneration module.

8. The method of claim 6 further comprising the step of deleting the executable regeneration module.

9. The method of claim 6 wherein the step of transmitting an execute command to the agent at each workstation occurs so as to enable simultaneous updating of each agent.

10. The method of claim 5 further comprising the step of restoring the agent by renaming the agent having the recovery name to be that of the agent.

11. A system for updating an agent used in a backup software program, the backup software program operating on a network having a server and a plurality of workstations, the system comprising:

a backup engine executing on the server; and an agent executing on each of the plurality of workstations to be backed up;

the backup engine transmitting an updated agent to each workstation and transmitting an executable regeneration module to each workstation and transmitting an execute command to the agent at each workstation;

the agent at each workstation storing the updated agent and the executable regeneration module at each workstation and causing the execution of the executable regeneration module;

the executable regeration module at each workstation, deleting the agent and renaming the updated agent to the name of the agent and thereafter enabling operation of the updated agent as the agent.

12. A system for updating an agent used in a backup software program, the backup software program operating on a network having a server and a plurality of workstations, the server coupled to a backup storage device, the system comprising:

a backup engine for execution on the server, the backup engine including
  means for transmitting an updated agent to each workstation,
  means for transmitting an executable regeneration module to each workstation, and
  means for transmitting an execute command to the agent at each workstation; and an agent at each workstation, the agent including
  means for storing the updated agent and the executable regeneration module at each workstation, and
  causing the execution of the executable regeneration module;

wherein the executable regeration module at each workstation renames the agent to a recovery name, renames the updated agent to the name of the agent, and enables operation of the updated agent as the agent.

13. The system of claim 12 further comprising means for executing the agent at a workstation to assist the backup engine in a backup operation where files stored on the workstation are backed up across the network to the backup storage device.

14. The system of claim 12 further comprising means for notifying the backup engine of successful receipt of the updated agent and the executable regeneration module.

* * * * *